US007890150B2

(12) United States Patent
Lee

(10) Patent No.: US 7,890,150 B2
(45) Date of Patent: Feb. 15, 2011

(54) WIRELESS COMMUNICATION DEVICE AND ANTENNA MODULE THEREOF

(75) Inventor: Cheng-Ju Lee, Taipei Hsien (TW)

(73) Assignee: Wistron Corporation, Hsichi, New Taipei (TW)

( * ) Notice: Subject to any disclaimer, the term of this patent is extended or adjusted under 35 U.S.C. 154(b) by 0 days.

(21) Appl. No.: 12/010,402

(22) Filed: Jan. 24, 2008

(65) Prior Publication Data

US 2010/0216520 A1 Aug. 26, 2010

(30) Foreign Application Priority Data

Oct. 26, 2007 (TW) .............................. 96140345 A

(51) Int. Cl.
*H04M 1/00* (2006.01)

(52) U.S. Cl. ................. 455/575.1; 455/562.1; 455/572; 455/550.1

(58) Field of Classification Search .............. 455/575.1, 455/562.1, 572, 550.1
See application file for complete search history.

(56) References Cited

U.S. PATENT DOCUMENTS 6,895,419 B1 * 5/2005 Cargin et al. ................ 708/131

FOREIGN PATENT DOCUMENTS

CN 1190805 A 8/1998

* cited by examiner

*Primary Examiner*—Nghi H Ly

(57) ABSTRACT

A antenna module comprises various different single-band miniature antennas respectively coupled to and hid inside individual batteries, and each antenna shares original terminals of the individual battery; the antenna module is allowed to use the terminals to electrically connect to a main body of a wireless communication device to enable the individual antenna module to receive signals in a different frequency range and the wireless communication device to be unnecessary to be disposed with various different single-band antennas. Whereby, space for original disposition of various different single-band antennas can be saved for the disposition of other components.

18 Claims, 3 Drawing Sheets

WIRELESS COMMUNICATION DEVICE AND ANTENNA MODULE THEREOF

BACKGROUND OF THE INVENTION

1. Field of the Invention

The present invention relates to an antenna of a wireless communication device, and more particularly to a miniature antenna coupled to a battery.

2. Description of Related Art

To the wireless communication technology, a high frequency antenna is developed from single frequency, dual frequency to triple frequency and even to four frequency (Wi-Fi is added), and it's designed and disposed at outside cellular phone to inside. At the present, a wireless communication device needing to be facilitated with an antenna is limited to a cellular phone no more; a device such as wireless communication television, GPS also relies on a successful antenna design to attain to the best efficiency. The current integrated wireless communication devices become more and more, for giving consideration to function and volume, an antenna with a smaller volume is the biggest challenge to antenna designers.

A general cellular phone may be built in with three or four antennas so as to cope with signal receiving and emitting of a device such as cellular phone communication, Wi-Fi, Bluetooth and even digital television. The future wireless standards with a different specification become more and more, few low power wireless transmission standards are possible to enter and be stationed in a cellular phone and more different application requirements appears, matching combinations between antennas, the avoidance of mutual interference between antennas and even the integration of antennas with a different application will be weight-bearing points of the future design.

To the current cellular phone, an antenna space is reduced smaller and smaller such that the performance of an antenna is sacrificed. An outer antenna is mostly adopted previously, the average efficiency thereof is beyond 50%; an internal antenna is mostly adopted at the present, the average efficiency thereof is seldom beyond 50%. A general market available cellular phone also has the efficiency lower than 20% even if it is made by a well-known company. The efficiencies of several slide or rotary phones in some frequency ranges are even only 10% approximately.

Some coupling structures of antenna and battery such as a GPS receiver module coupled to a handset battery discloses in Taiwan Patent No. M291100 comprises a GPS receiver module capable of being electrically connected to a battery contact and used for capturing electric power to execute the satellite signal receiving function and a connecting body used for enabling the GPS receiver module to be inlayed in a battery, in which the connecting body can inlay the GPS receiver module in the battery by means of plastic injection or connect the GPS receiver module to the battery by installing a accepting structure on an outside body of the battery.

A quadratic battery disclosed by Taiwan Patent Publishing No. 200707820 is provided with a ring-typed antenna; the ring-typed antenna is printed on a protection circuit board, and installed in or attached to a battery unit to allow the protection circuit board to be electrically connected to the battery unit to transmit or receive radio frequency signals.

SUMMARY OF THE INVENTION

For satisfying multiple frequency range design of an antenna and corresponding to the requirement of a miniature antenna needed for a wireless communication device, the present invention is proposed.

The main object of the present invention is to provide a wireless communication device and an antenna module, enabling the wireless communication device to have a variety of antennas with a different signal receiving frequency range to be respectively covered in a housing of a battery and integrated with the battery to enable the battery to not only provide electric power needed for the wireless communication device but also have the internal antenna function.

Another object of the present invention is to provide a wireless communication device and an antenna module thereof, enabling the wireless communication device to have the function of building in different antennas and be unnecessary to further design a space for building in a variety of antennas by replacing a battery disposed with a different antenna with another thereby saving space for furnishing with other components.

Still another object of the present invention is to provide a wireless communication device and an antenna module thereof, enabling a battery to be disposed with a single-band antenna to enable the antenna to have a larger disposition space and not to have an interference with other antennas to strengthen the signal receiving efficiency of the wireless communication device.

For attaining to the objects mentioned above, the present invention proposes an antenna module capable of power supply and signal transmission for a wireless communication device, said antenna module comprising:

a upper housing;

a lower housing, coupled to said upper housing;

a first contact unit lain in between said upper housing and said lower housing for electrically connecting to a main body of the wireless communication device, and having a plurality of terminals coupled to said lower housing;

a battery disposed between said upper housing and said lower housing, and having a positive unit and a negative unit;

an antenna disposed between said upper housing and said battery, and having a conductive feeding unit and a conductive grounding unit; and a plate member means for preventing said battery from interfering with said antenna, said plate member being disposed between said battery and said antenna;

wherein said antenna module forms in the shape of said battery of the wireless communication device; said positive unit and said negative unit of said battery, said conductive feeding unit of said antenna, and said conductive grounding unit of said antenna are respectively electrically connected to each of said plurality of terminals of said first contact unit to allow the wireless communication device to have the function of building in different antennas by replacing a battery disposed with a different antenna with another, and further designing a space for building in a variety of antennas is unnecessary and space for disposing other components can be saved.

The present invention also proposes a wireless communication device having a main body and an antenna module capable of power supply and signal transmission for said main body, said wireless communication device receiving a range of frequency bands by the installation of selective antenna module, said antenna module comprising:

a upper housing;

a lower housing, coupled to said upper housing;

a first contact unit disposed between said upper housing and said lower housing for electrically connecting to a main body of the wireless communication device, and having a plurality of terminals coupled to said lower housing;

a battery disposed between said upper housing and said lower housing, and having a positive unit and a negative unit;

an antenna, disposed between said upper housing and said battery, and having a conductive feeding unit and a conductive grounding unit; and a plate member means, used for preventing said battery from interfering with said antenna, said plate member being disposed between said battery and said antenna;

wherein said positive unit and said negative unit of said battery, said conductive feeding unit of said antenna and said conductive grounding unit of said antenna are respectively electrically connected to each of said plurality of terminals of said first contact unit; and said main body has a grooving space for said antenna module, and further has a second contact unit corresponding to said first contact unit, said first contact unit is electrically connected to said second contact unit to allow the wireless communication device to have the function of building in different antennas by replacing a battery disposed with a different antenna with another, and further designing a space for building in a variety of antennas is unnecessary and space for disposing other components can be saved.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

As an antenna of a wireless communication device such as cellular phone needs to satisfy the requirement of five frequency ranges, a required space for an antenna installment is relatively large. In addition, because an interference source is not allowed to place around the antenna, it causes one fifth area of the wireless communication device to be an antenna clearance zone to cause the space design of the wireless communication device to be more difficult.

If a GSM antenna or UMTS antenna can be divided into a few receiving frequency modules, becomes external replaceable antenna modules and matches a wireless communication device having a CPU of five or more than five frequency ranges, it will have the following merits: firstly, an antenna design will not cause difficulty on a space design of a wireless communication device; secondly, comparing a single-band antenna with a multi-band antenna disposed at the same area, the efficiency of the single-band antenna is much higher than the efficiency of the multi-band antenna, and the single-band antenna will not interfere with other antennas as well as is capable of strengthening the signal efficiency of the wireless communication device.

Figure 1:
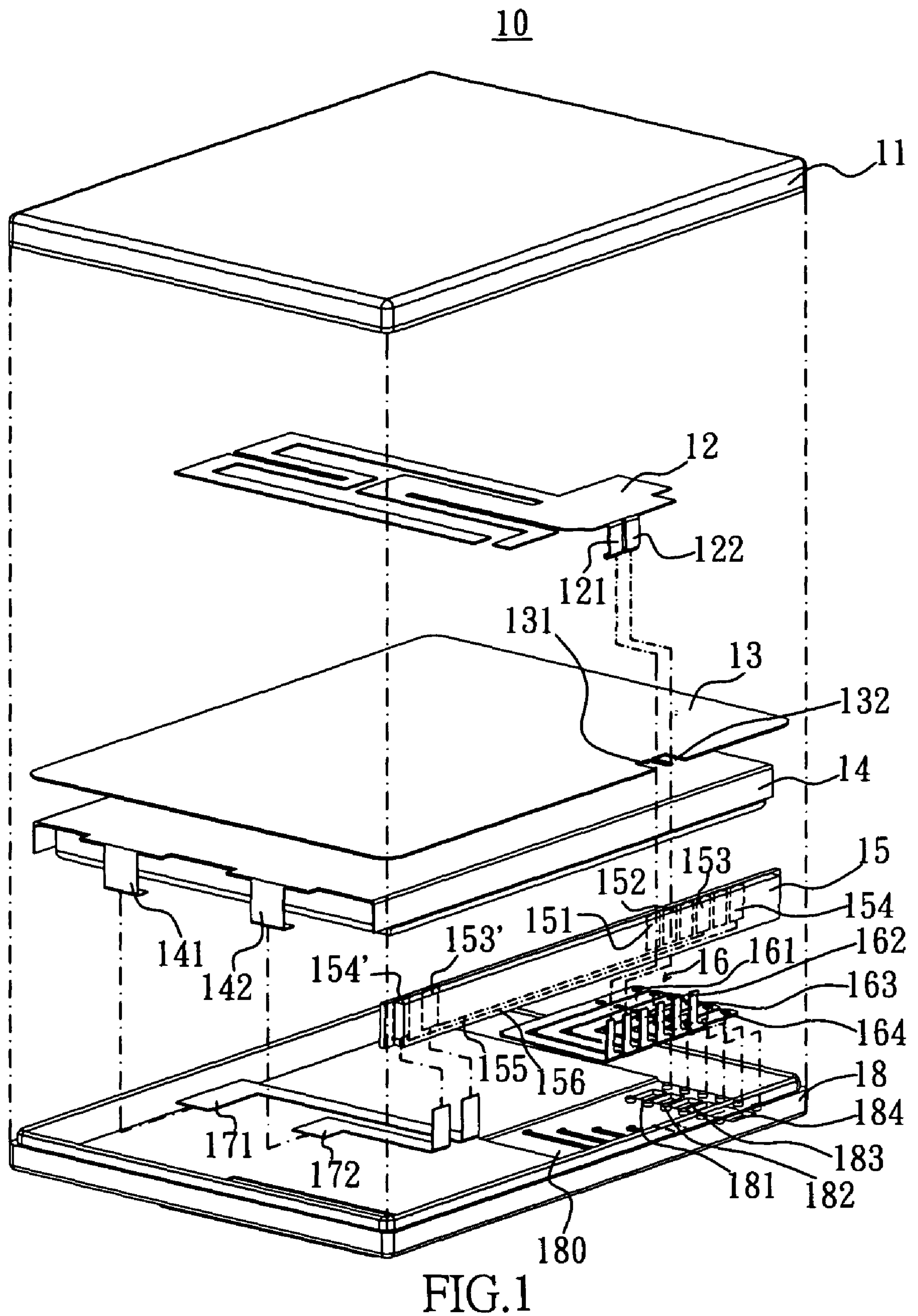
FIG. 1 is an exploded view, showing an antenna module of a preferred embodiment according to the present invention.
Figure 2:
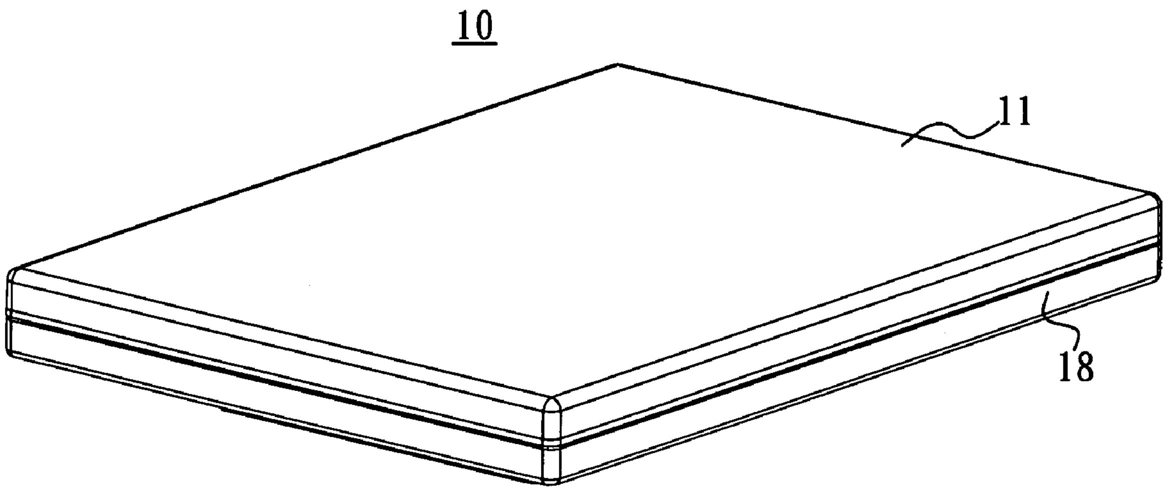
FIG. 2 is a schematic view, showing an outlook of an antenna module of the preferred embodiment according to the present invention.

That a GSM antenna or a UMTS antenna is divided into a few receiving frequency range modules mentioned above is applied to become a design concept of an external replaceable antenna module. Please refer to FIGS. 1 and 2. FIGS. 1 and 2 show an antenna module of a preferred embodiment according to the present invention. An antenna module 10 having a battery outlook is used for coupling to a main body of a wireless communication device to provide power and the radio signal transmission function. The antenna module 10 comprises a upper housing 11, an antenna 12, a plate member 13, a battery 14, a side plate 15, a first contact unit 16, a first conduction unit 171, a second conduction unit 172 and a lower housing 18.

The antenna 12 is disposed with a conductive feeding unit 121 and a conductive grounding unit 122; the plate member 13 is disposed with a first slot 131 and a second slot 132; the battery 14 is disposed with a positive terminal guide unit 141 and a negative terminal guide unit 142; the side plate 15 is disposed with a plurality of conductive nodes 151, 152, 153, 153', 154 and 154'. The side plate 15 should be a circuit board, the conduct contacts 153 and 154 are respectively electrically connected with the conductive nodes 153' and 154' through PCB traces 155 and 156 of the side plate 15, copper foils attached onto the side plate 15 or leading wires outside the side plate 15. The first contact unit 16 is disposed with a plurality of terminals 161, 162, 163 and 164; the lower housing 18 is disposed with a groove 180 coupled to the first contact unit 16; a plurality of through holes 181, 182, 183 and 184 communicated with the groove 180 are respectively disposed on positions in the groove 180 corresponding lower sides of the plurality of terminals 161, 162, 163 and 164.

The groove 180 of the lower housing 18 is coupled to the first contact unit 16; the side plate 15 is coupled to the upper housing 11 and one side inside the upper housing 18. One end of the first conduction unit 171 and one end of the second conduction unit 172 respectively contact with the positive and the negative units 141 and 142 of the battery 14; another end of the first conduction unit 171 and another end of the second conduction unit 172 respectively contact with the conductive nodes 153' and 154' of the side plate 15. As the conductive nodes 153' and 154' are respectively electrically connected to the conductive nodes 153 and 154, and the conductive nodes 153 and 154 respectively contact with the terminals 163 and 164 of the first contact unit 16, the positive and the negative units 141 and 142 are respectively electrically connected with the terminals 163 and 164 of the first contact unit 16. The plate member 13 is placed above the battery 14; the antenna 12 is placed above the plate member 13 to enable the antenna 12 not to be interfered by the battery 14. The conductive feeding unit 121 and conductive grounding unit 122 of the antenna 12 are respectively passed through the first and the second slots 131 and 132 of the plate member 13 and then contact with the conductive nodes 151 and 152 of the side plate 15 and respectively contact with the terminals 161 and 162 of the first contact unit 16. The upper housing 11 covers a upper side of the antenna 12 and is coupled to the lower housing 18 to allow the antenna 12, the plate member 13, the battery 14, the side plate 15, the contact unit 16 and the first and the second conduction units 171 and 172 are all accepted inside the upper and the lower housings 11 and 18 to allow an outlook of the antenna module 10 to look like an outlook of a battery of a general wireless communication device as FIG. 2 shows, and is completely different from outlooks of the structures coupling a battery to an antenna disclosed by the Taiwan patents mentioned above.

Figure 3:
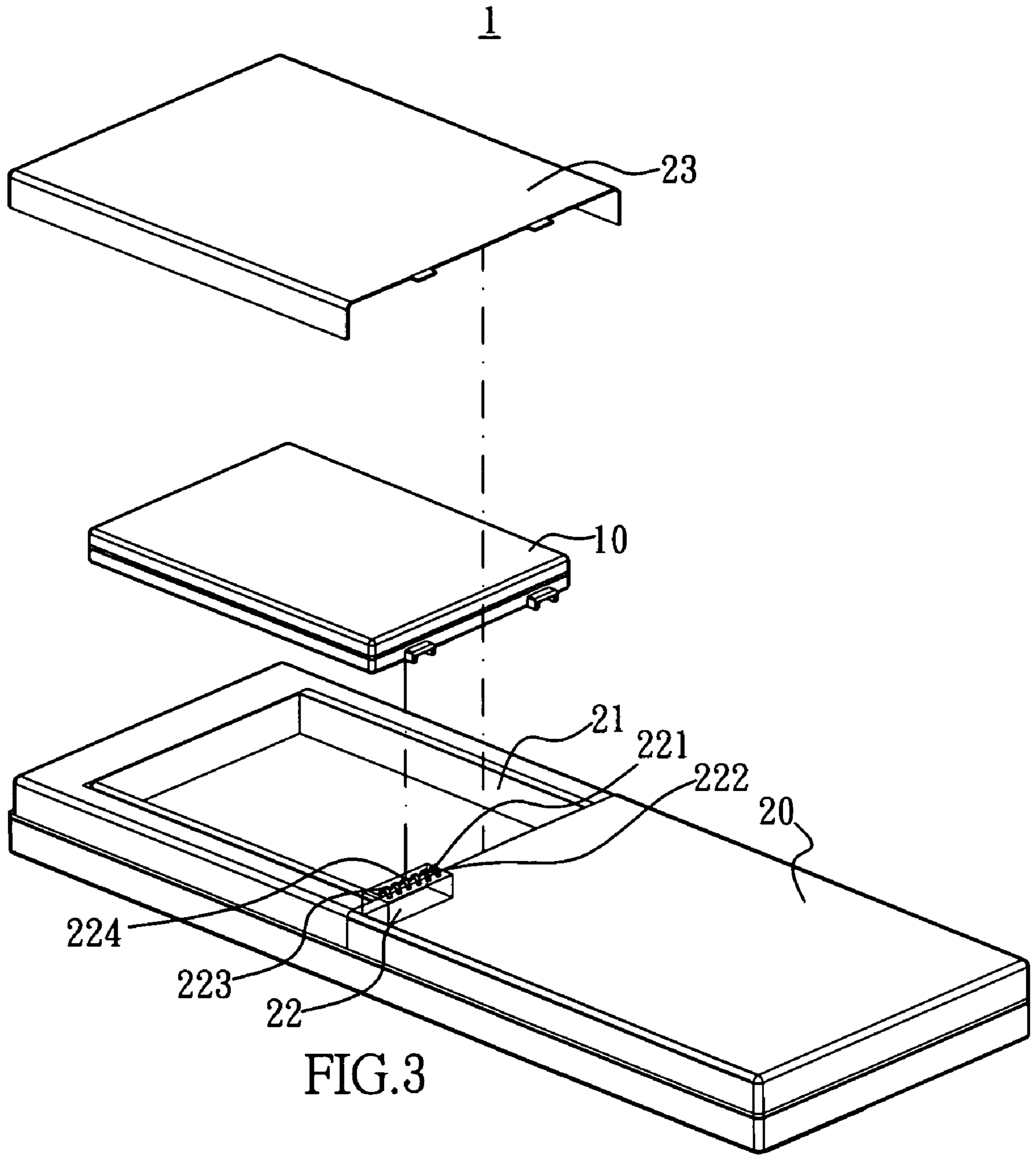
FIG. 3 is a schematic view, showing a main body of a wireless communication device and an antenna module of the preferred embodiment according to the present invention before being coupled to each other.
Figure 4:
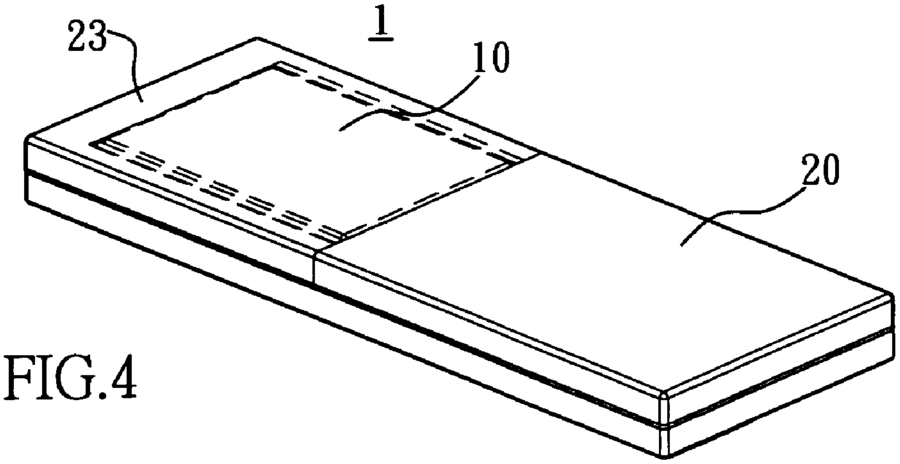
FIG. 4 is a schematic view, showing a main body of a wireless communication device and an antenna module of the preferred embodiment according to the present invention after being coupled to each other.

Please refer to FIGS. 1, 3 and 4. A wireless communication device 1 of the present invention comprises an antenna module 10, a main body 20 and a cover 23; the main body 20 is disposed with a grooving space 21 used for accepting the antenna module 10; a corresponding second contact unit 22 is disposed on a position of the main body 20 corresponding to the first contact unit 16 and the second contact unit 22 is disposed with a plurality of resilient members 221, 222, 223 and 224 extended in the grooving space 21; the resilient members 221, 222, 223 and 224 may respectively extended in the through holes 181, 182, 183 and 184 of the lower housing 18 to respectively contact with the corresponding terminals 161, 162, 163 and 164 to allow the antenna module 10 to be electrically connected to the main body 20 to enable the antenna 12 and the battery 14 to be respectively electrically connected to the main body 20. The cover 23 is coupled to the main body 20 to shield the grooving space 21 as FIG. 4 shows.

According to the present invention, various different single-band miniature antennas are respectively hid inside individual batteries, each of them shares original terminals of the individual battery and each individual battery is allowed to become an antenna module for receiving signals in a different frequency range. For example, the modules can be divided into an antenna module for receiving GSM900 and GSM 1800 signals, an antenna module for receiving GSM 850 and GSM1900 signals and a miniature antenna receiving module for receiving UMTS2100 signals depending on use district. Thus, it is unnecessary to respectively build an antenna for receiving GSM900 and GSM1800 signals, an antenna for receiving GSM850 and GSM 1900 and an antenna for receiving UMTS2100 inside a wireless communication device. Therefore, a wireless communication device of the present invention is unnecessary to be disposed with various frequency ranges of antenna, space used for originally disposing various different single-band antennas can be saved for the dispositions of other components. Whereby, the signal receiving function of a cellular phone can be enforced through the disposition of a single-band antenna and the interference between different antennas is not yielded.

When a user positions at a district of a receiving frequency range, he may assemble an antenna battery matching the receiving frequency range to a wireless communication device, and when he reaches an district of another receiving frequency range, he may then assemble another antenna battery matching the another receiving frequency range to the wireless communication device so that the wireless communication device can be conveniently used, and the better, signal receiving effect can be obtained to allow the wireless communication device to have the function of building in different antennas by replacing a battery disposed with an antenna with a battery disposed with another different antenna and so on without needing to further design a space for enabling various antennas to be built in to save the space for the dispositions of other components.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An antenna module capable of power supply and signal transmission for a wireless communication device, said antenna module comprising:

a upper housing;

a lower housing, coupled to said upper housing;

a first contact unit lain in between said upper housing and said lower housing for electrically connecting to a main body of the wireless communication device, and having a plurality of terminals coupled to said lower housing;

a battery disposed between said upper housing and said lower housing, and having a positive unit and a negative unit;

an antenna disposed between said upper housing and said battery, and having a conductive feeding unit and a conductive grounding unit; and a plate member means for preventing said battery from interfering with said antenna, said plate member being disposed between said battery and said antenna;

wherein said antenna module forms in the shape of said battery of the wireless communication device; said positive unit and said negative unit of said battery, said conductive feeding unit of said antenna, and said conductive grounding unit of said antenna are respectively electrically connected to each of said plurality of terminals of said first contact unit.

2. The antenna module according to claim 1, wherein said lower housing has a groove for said first contact unit, each of a plurality of through holes perforated through the groove corresponds to each of the plurality of terminals of said first contact unit, and is disposed under each of the terminals.

3. The antenna module according to claim 2, wherein said plate member is disposed above said battery, and said antenna is disposed above said plate member.

4. The antenna module according to claim 3, wherein said plate member has a first slot and a second slot; said first slot and said second slot are respectively used for said conductive feeding unit and said conductive grounding unit of said antenna.

5. The antenna module according to claim 4, wherein one side of said upper housing and one side of said lower housing are coupled to a side plate; said side plate is disposed with a plurality of conductive nodes; said conductive feeding unit and said conductive grounding unit are respectively passed through said first slot and said second slot to electrically connect to said plurality of conductive nodes of said side plate, and further electrically connect to said plurality of terminals of said first contact unit.

6. The antenna module according to claim 5, wherein said conductive feeding unit and said conductive grounding unit respectively contact with said plurality of conductive nodes of said side plate, and further respectively contact with said plurality of terminals of said first contact unit.

7. The antenna module according to claim 6, wherein said positive unit and said negative guide unit of said battery respectively contact with one end of a first conduction unit and one end of a second conduction unit; another end of said first conduction unit and another end of said second conduction unit respectively contact with said plurality of conductive nodes of said side plate, and are respectively connected to said plurality of terminals of said first contact unit.

8. The antenna module according to claim 7, wherein said plurality of conductive nodes of said side plate are respectively electrically connected with said plurality of another conductive nodes of said side plate through one structure selected from a group constituted by PCB traces of said side plate, copper foils attached onto said side plate and leading wires outside said side plate, said plurality of another conductive nodes of said side plate are respectively contact with said plurality of terminals of said first contact unit.

9. A wireless communication device having a main body and an antenna module capable of power supply and signal transmission for said main body, said wireless communication device receiving a range of frequency bands by the installation of selective antenna module, said antenna module comprising:

a upper housing;

a lower housing, coupled to said upper housing;

a first contact unit disposed between said upper housing and said lower housing for electrically connecting to a main body of the wireless communication device, and having a plurality of terminals coupled to said lower housing;

a battery disposed between said upper housing and said lower housing, and having a positive unit and a negative unit;

an antenna, disposed between said upper housing and said battery, and having a conductive feeding unit and a conductive grounding unit; and a plate member means for preventing said battery from interfering with said antenna, said plate member being disposed between said battery and said antenna;

wherein said positive unit and said negative unit of said battery, said conductive feeding unit of said antenna and said conductive grounding unit of said antenna are respectively electrically connected to each of said plurality of terminals of said first contact unit; and said main body has a grooving space for said antenna module, and further has a second contact unit corresponding to said first contact unit, said first contact unit is electrically connected to said second contact unit.

10. The wireless communication device according to claim 9, wherein said lower housing has a grooving space for said first contact unit, each of a plurality of through holes perforated through the grooving space corresponds to each of the plurality of terminals of said first contact unit, and is disposed under each of the terminals.

11. The wireless communication device according to claim 9, wherein said second contact unit has a plurality of resilient members extended in said grooving space, each of said resilient members is respectively extended in each of corresponding through holes of said lower housing to electrically contact with each of said corresponding terminals.

12. The wireless communication device according to claim 11, further comprising a cover coupled to said main body for shielding said grooving space.

13. The wireless communication device according to claim 12, wherein said plate member is disposed above said battery, and said antenna is disposed above said plate member.

14. The wireless communication device according to claim 13, wherein said plate member has a first slot and a second slot respectively accept said conductive feeding unit and said conductive grounding unit of said antenna.

15. The wireless communication device according to claim 14, wherein an edge of said upper housing and one side of said lower housing are respectively coupled to a side plate; said side plate has a plurality of conductive nodes; said conductive feeding unit and said conductive grounding unit are respectively passed through said first slot and said second slot, and further respectively electrically connected to said plurality of conductive nodes of said side plate, and even further electrically connected to each of said plurality of terminals of said first contact unit.

16. The wireless communication device according to claim 15, wherein said conductive feeding unit and said conductive grounding unit respectively electrically contact with said plurality of conductive nodes of said side plate, and respectively electrically contact with said plurality of terminals of said first contact unit.

17. The wireless communication device according to claim 16, wherein said positive unit and said negative unit of said battery respectively contact with one end of said first conduction unit and said second conduction unit; another end of said first conduction unit and said second conduction unit respectively contact with said plurality of conductive nodes of said side plate, and further respectively connect to said plurality of terminals of said first contact unit.

18. The wireless communication device according to claim 17, wherein said plurality of conductive nodes of said side plate are respectively electrically connected with said plurality of another conductive nodes of said side plate through one structure selected from a group constituted by PCB traces of said side plate, copper foils attached onto said side plate and leading wires outside said side plate, said plurality of another conductive nodes of said side plate are respectively contact with said plurality of terminals of said first contact unit.

* * * * *